No. 687,923. Patented Dec. 3, 1901.
S. N. LONG.
FIFTH WHEEL.
(Application filed Apr. 23, 1901.)
(No Model.)
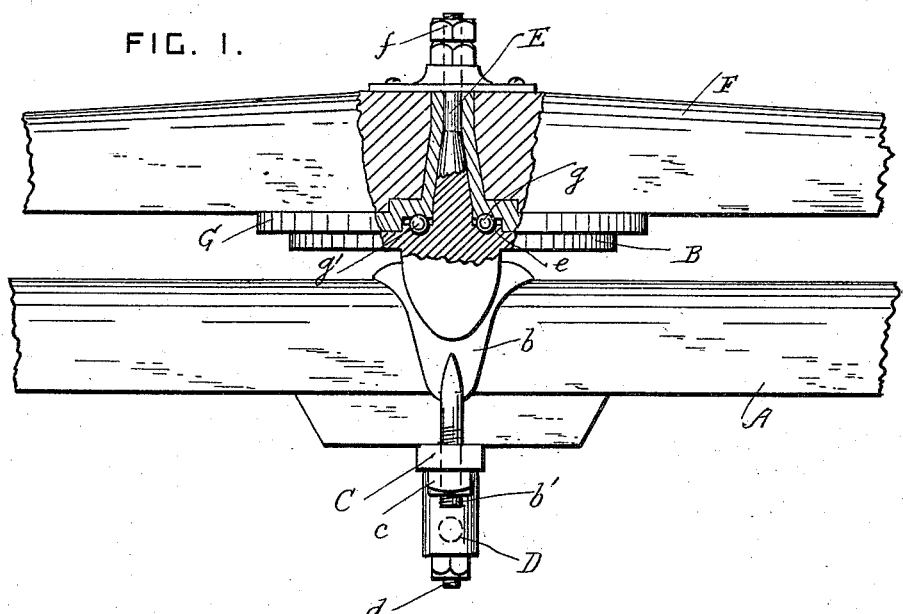
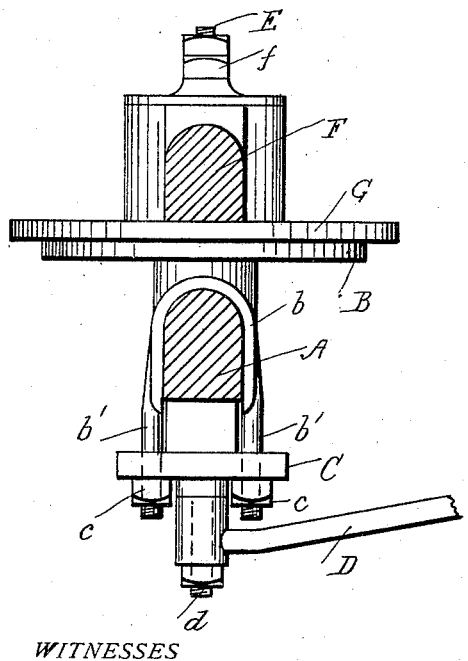
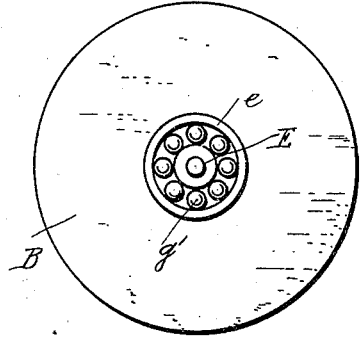
WITNESSES
Walter Allen
A. G. Heylmun
INVENTOR
S. N. Long
by Herbert W. T. Jenner.
Attorney

UNITED STATES PATENT OFFICE.

SAMUEL N. LONG, OF WEST HARWICH, MASSACHUSETTS.

FIFTH-WHEEL.

SPECIFICATION forming part of Letters Patent No. 687,923, dated December 3, 1901.

Application filed April 23, 1901. Serial No. 57,100. (No model.)

*To all whom it may concern:*

Be it known that I, SAMUEL N. LONG, a citizen of the United States, residing at West Harwich, in the county of Barnstable and State of Massachusetts, have invented certain new and useful Improvements in Fifth-Wheels; and I do hereby declare the following to be a full, clear, and exact description of the invention, such as will enable others skilled in the art to which it appertains to make and use the same.

This invention relates to fifth-wheels for vehicles; and it consists in the novel construction and combination of the parts hereinafter fully described and claimed.

In the drawings, Figure 1 is a front view of the fifth-wheel, partly in section. Fig. 2 is a side view of the same. Fig. 3 is a plan view of the lower plate, showing the ball-bearing.

A is a portion of the axle of a vehicle.

B is a lower bearing-plate provided with a clip $b$, which straddles the axle and is provided with bolts $b'$ at its lower ends.

C is a cross-bar under the axle. The cross-bar has holes through which the ends of the bolts $b'$ project, and $c$ represents nuts on the ends of the said bolts for securing the lower plate B firmly to the axle. The cross-bar C has a stem $d$, and D is a stay which engages with the said stem.

A center pin E projects vertically from the lower bearing-plate B, and $e$ is a ball-race formed in the plate B around the base of the pin E. The pin E is preferably tapered, and it turns in a socket in the cross-bar F, which is secured to the body of the vehicle. Nuts $f$ are provided on the upper end of the pin E for holding the parts in working contact.

G is the upper bearing-plate, secured to the cross-bar F and overlapping the plate B slightly, so that dirt cannot fall upon it. The upper bearing-plate is provided with a ball-race $g$, and $g'$ represents antifriction-balls which run in the ball-races between the two said plates.

This fifth-wheel is simple and easily constructed, and it turns very freely on its axis.

What I claim is—

In a fifth-wheel, the combination, with a lower bearing-plate having a central pivot-pin, a ball-race close adjacent to the base of the pin, and a clip for securing the said plate to the axle, all the said parts being formed integral with the said plate; of an upper bearing-plate which is journaled on the said pin and arranged in contact with the said lower bearing-plate and provided with a ball-race over the aforesaid ball-race; and balls between the said races, substantially as set forth.

In testimony whereof I affix my signature in presence of two witnesses.

SAMUEL N. LONG.

Witnesses:
ALICE J. MURRAY,
FRED. K. DAGGETT.